(12) United States Patent
Reinprecht

(10) Patent No.: US 10,589,662 B2
(45) Date of Patent: Mar. 17, 2020

(54) ADJUSTING SYSTEM FOR A VEHICLE LIGHTING APPARATUS, AND METHOD FOR OPERATING SUCH AN ADJUSTING SYSTEM

(71) Applicant: ZKW Group GmbH, Wieselburg (AT)

(72) Inventor: Markus Reinprecht, Pielachhauser (AT)

(73) Assignee: ZKW GROUP GMBH, Wieselburg (AT)

( * ) Notice: Subject to any disclaimer, the term of this patent is extended or adjusted under 35 U.S.C. 154(b) by 207 days.

(21) Appl. No.: 15/746,627

(22) PCT Filed: Jul. 27, 2016

(86) PCT No.: PCT/AT2016/060021
§ 371 (c)(1),
(2) Date: Jan. 22, 2018

(87) PCT Pub. No.: WO2017/020056
PCT Pub. Date: Feb. 9, 2017

(65) Prior Publication Data
US 2018/0215309 A1    Aug. 2, 2018

(30) Foreign Application Priority Data

Jul. 31, 2015 (AT) .................................. 50691/2015

(51) Int. Cl.
*G06F 7/00* (2006.01)
*B60Q 1/14* (2006.01)
*B60Q 1/08* (2006.01)

(52) U.S. Cl.
CPC ............. *B60Q 1/1423* (2013.01); *B60Q 1/08* (2013.01); *B60Q 1/085* (2013.01);
(Continued)

(58) Field of Classification Search
CPC ........ B60Q 1/1423; B60Q 1/085; B60Q 1/08; B60Q 2300/33; B60Q 2300/312; B60Q 2300/05; B60Q 2300/21; B60Q 2900/30
(Continued)

(56) References Cited

U.S. PATENT DOCUMENTS 6,609,817 B2    8/2003    Niwa et al.
8,768,576 B2    7/2014    Osanai
(Continued)

FOREIGN PATENT DOCUMENTS

CN    104590096 A    5/2015
DE    10338756 A1    3/2005
(Continued)

OTHER PUBLICATIONS

Office Action issued in Austrian Application No. A 5069112015, completed Jul. 13, 2016 (3 pages).
(Continued)

*Primary Examiner* — Shardul D Patel
(74) *Attorney, Agent, or Firm* — Eversheds Sutherland (US) LLP

(57) ABSTRACT

An adjusting system for a lighting apparatus for vehicles is configured to emit light for forming a light distribution described by a parameter set. The adjusting system includes a light control unit and is configured to modify the light distribution. The parameter set describing the light distribution is stored in the light control unit, which and configured to control the lighting apparatus such that the lighting apparatus emits light for forming the light distribution in accordance with the parameter set into an area in front of the lighting apparatus. An operator control unit separate from both the lighting apparatus and the light control unit is configured to accept user inputs and to transmit the user inputs to the light control unit, which is configured to modify the parameter set in accordance with the user inputs to produce a further parameter set describing a further user-defined, preferably dynamic, light distribution.

23 Claims, 5 Drawing Sheets

Figure 1:
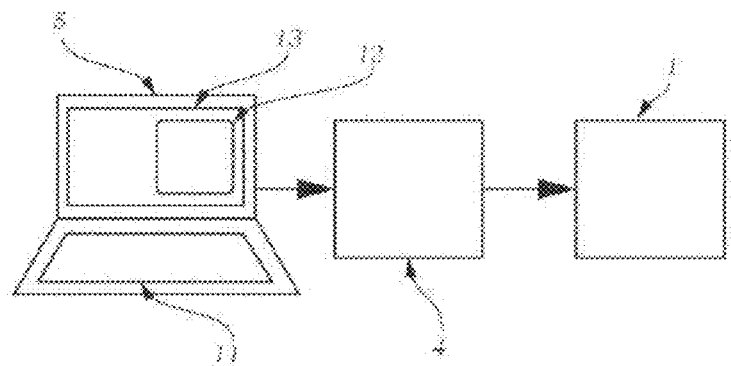

(52) U.S. Cl.
CPC ...... *B60Q 2300/05* (2013.01); *B60Q 2300/21* (2013.01); *B60Q 2300/312* (2013.01); *B60Q 2300/33* (2013.01); *B60Q 2900/30* (2013.01)

(58) Field of Classification Search
USPC .............................. 701/36, 49; 362/465, 526
See application file for complete search history.

(56) References Cited

U.S. PATENT DOCUMENTS

| | | | |
|---|---|---|---|
| 9,243,771 B2 | 1/2016 | Jungwirth et al. | |
| 9,777,901 B2 | 10/2017 | Reinprecht et al. | |
| 2002/0080617 A1* | 6/2002 | Niwa .................... | B60Q 1/085 362/465 |
| 2004/0218401 A1* | 11/2004 | Okubo .................. | B60Q 1/085 362/526 |
| 2005/0111231 A1 | 5/2005 | Crodian et al. | |
| 2009/0254247 A1 | 10/2009 | Osanai | |
| 2013/0006480 A1* | 1/2013 | Osanai .................. | B60Q 1/143 701/49 |
| 2014/0232294 A1* | 8/2014 | Fredricks ........... | H05B 37/0245 315/297 |
| 2014/0347179 A1 | 11/2014 | Fleszewski et al. | |
| 2014/0375448 A1* | 12/2014 | Lee ....................... | B60Q 1/444 340/479 |

FOREIGN PATENT DOCUMENTS

| | | |
|---|---|---|
| DE | 102011055794 A1 | 5/2013 |
| DE | 202015001183 U1 | 4/2015 |
| DE | 102013021941 A1 | 7/2015 |
| EP | 1433655 A2 | 6/2004 |
| KR | 20130104330 A | 9/2013 |

OTHER PUBLICATIONS

International Search Report and Written Opinion for PCT/AT2016/060021, dated Nov. 2, 2016 (12 pages).

* cited by examiner

ADJUSTING SYSTEM FOR A VEHICLE LIGHTING APPARATUS, AND METHOD FOR OPERATING SUCH AN ADJUSTING SYSTEM

The invention relates to an adjusting system for a lighting apparatus for vehicles, which lighting apparatus is configured to emit light for forming at least one light distribution described by a parameter set into an area in front of the lighting apparatus, wherein the adjusting system is configured to modify the at least one (unmodified) light distribution described by the parameter set, and wherein the adjusting system comprises a light control unit, in which light control unit the parameter set describing the light distribution is stored, and which light control unit is assigned to the lighting apparatus and is configured to control the lighting apparatus in such a way that the lighting apparatus emits light for forming the at least one light distribution in accordance with the parameter set into an area in front of the lighting apparatus.

The invention also relates to a method for operating at least one adjusting system for a lighting apparatus for vehicles, which lighting apparatus is configured to emit light for forming at least one, preferably dynamic, light distribution described by a parameter set into an area in front of the lighting apparatus, wherein the adjusting system is configured to modify the at least one light distribution described by the parameter set, and wherein the adjusting system comprises a light control unit, in which light control unit the parameter set describing the light distribution is stored, and which light control unit is assigned to the lighting apparatus and is configured to control the lighting apparatus in such a way that the lighting apparatus emits light for forming the at least one light distribution in accordance with the set parameters into an area in front of the lighting apparatus.

Due to the wide geographical range of the areas in which vehicles are used and also due to the high diversity of driving styles adopted by different drivers, a need has arisen to be able to adapt the vehicle lighting to geographical aspects of the areas in which a vehicle is used and to individual requirements of the vehicle user. It is therefore more advantageous in flat environments to use light distributions concentrated in the middle (HV point), since very long, straight routes are usually found here. For other vehicle users, a broader light distribution is advantageous, since it offers improved illumination of the road over curved routes and can be seen further into a bend.

Devices allowing the vehicle user to adjust and/or modify the light distribution emitted by a lighting apparatus of the vehicle are known from the prior art.

For example, the subject of application WO 2013/118929 A1 is a variably configurable brake light control system with use of a user terminal and a method for controlling this system. Here, it is disadvantageous that the technical teaching disclosed in this document relates solely to brake lights with LED arrangements. The drawings indeed suggest that the produced light patterns can be displayed in principle at the user terminal, but there is no mention of a display of in particular dynamic, legally compliant light distributions generated by lighting apparatuses in the vehicle front region, for example by front headlamps.

The utility model document DE 20 2015 001 183 U1 describes freely programmable rear lights on motor vehicles. The description mentions the lighting test equipment specific to the Federal Republic of Germany (Technischer Überwachungsverein (Technical Inspection Association) TÜV, Deutscher Kraftfahrzeug-Überwachungs-Verein e.V. (German vehicle inspection company) DEKRA), but makes no mention of the legal requirements forming the basis of the tests. Use of the invention to provide front-end lighting subject to technical feasibility is also mentioned, however a person skilled in the art is not provided with sufficient technical teaching to create a device of this kind for the front lighting systems, inter alia for the front headlamps.

Document DE 10 2013 021 941 A1 relates to a vehicle lighting apparatus which provides a lighting setting on the basis of data input by the driver, but there is no mention here of observing limit values, specified by relevant legal requirements, for the light image emitted onto the roadway. However, application of the vehicle lighting apparatus mentioned in this document only to vehicles in a parked state is disclosed. An application beyond this scope is neither desirable nor discussed, and there is no suggestion of use of this vehicle lighting apparatus to generate a preferably dynamic, legally compliant light distribution in a vehicle during operation.

In principle it can be said that light systems which are suitable for generating segmented light distributions (for example segmented main beam distributions) do not generate a light image solely by the optical design. By means of modern optical components, such as micro mirror arrays (DLP, DMD), but also by semiconductor light sources such as LEDs (LED=light-emitting diode) or laser diodes, it is possible to influence the light distribution also by control of these components. A further influencing factor on the light image is the particular light intensity modulation (dimming) of the individual segments which is provided with the aid of software (of an application program) installed on a control unit. The light image can thus be adapted within certain limits by software. These limits are defined both as maximum and minimum values on the one hand in legal requirements, which for example can be found in specific regulations such as UN/ECE R123 series of amendments 01, Suppl.6 (on the question of right-hand and left-hand traffic, see paragraphs 5.4 and 5.8 and in particular paragraph 5.8.2 with the sub paragraphs) and UN/ECE R48, and on the other hand are technical limit values. For example, the overall light output can be uniformly distributed over the entire carriageway, or can be more concentrated in the middle of the carriageway. In the latter case, a maximum admissible energising of the light sources of the lighting apparatus in the vehicle headlamp (for example LEDs and/or laser light sources) constitutes a technical limit value. In addition, the heat dissipation often plays a key role in the light sources, and therefore further energising limits are set. For example, hot spots can form in the event of an excessively high output, which hot spots exceed the maximum temperature of the LEDs and/or laser light sources.

Particularly in light systems which comprise LEDs as light sources and generate segmented light distributions, the outer segments are often only operated with approximately 10%. The average dimming over all segments can be approximately 30%. Here, the middle segments are often operated only at 80%. This is problematic with regard to the effective output of the light sources, which in this case is not reached during operation. In other words, more power is installed than is actually used, thus increasing the costs of the apparatus (higher power normally leads to higher costs).

In addition, it should be mentioned that it is a known technical practice in the field of vehicle lighting technology to simulate light distributions for a defined, specified optical configuration formed of light sources, lenses, apertures, reflectors, etc. with the aid of specific application programs, which allow configurations and adjustments of lighting parameters selected by a person skilled in the art (in this case by a lighting engineer), on computers in a workshop configured especially for this purpose and to adjust said simulated light distributions. An adjusting system of this kind is illustrated schematically in FIG. 1. Here, headlamp prototypes can be tested both prior to installation in a test vehicle and in a state installed in a test vehicle within the scope of field tests by corresponding controllers with connected operator control units and with the aid of special application programs. A disadvantage of systems of this kind is that they are very costly and complex in terms of their handling, and therefore the operation of such systems requires the knowledge of a lighting technician, i.e. of a person skilled in the art, and they cannot be used by a vehicle user who has no specialist knowledge in the field of light technology.

The object of the invention is to overcome the above-mentioned disadvantages of the prior art and to enable the vehicle user to generate self-defined light distributions under consideration of the above-described technical limit values and legal requirements or to individually adjust the light distributions already provided.

The object of the invention is achieved with an adjusting system of the above-described type, in which an operator control unit formed separately from the lighting apparatus and from the light control unit is assigned to the light control unit, which operator control unit is configured to accept user inputs and to transmit the user inputs to the light control unit, wherein the light control unit is configured to modify the parameter set in accordance with the user inputs to produce a further parameter set describing at least one further user-defined light distribution (modified light distribution), and to adjust the lighting apparatus in such a way that the lighting apparatus emits light for forming the at least one further user-defined light distribution in accordance with the further parameter set into an area in front of the lighting apparatus.

It can be provided advantageously that the light distribution and/or the user-defined light distribution are/is formed as a dynamic light distribution.

With regard to the placing on the market of the adjusting system, it can be advantageous if the light distribution and/or the user-defined light distribution are/is formed as a light distribution compliant with legal standards.

With regard to the computing power necessary from the light control unit, it is expedient if the operator control unit is configured to call up the parameter set from the light control unit, to modify the parameter set to form the further parameter set in accordance with the user inputs, and to transmit the modified parameter set to the light control unit.

In order to retain the user adjustments, it can be advantageous if the operator control unit is configured to store the parameter set and the modified parameter set.

It can be expedient if the light distribution and the user-defined light distribution belong to the same defined type of light distributions.

In order to simplify the operation of the operator control unit, it can be provided that the user can choose between types of light distributions and adapts these within the type. Here, it can be expedient if the type of light distribution is a dipped beam distribution and/or a main beam distribution and/or a daytime running light distribution and/or a cornering light distribution and/or a fog light distribution and/or a poor weather light distribution.

It can be provided advantageously that the operator control unit is formed as a portable terminal, preferably a mobile telephone, in particular a smartphone, or a laptop, in particular a notebook, or a tablet.

In addition, it can be particularly advantageous if the operator control unit transmits the user inputs to the light control unit wirelessly, preferably by means of NFC (near-field communication) or Bluetooth or infrared or WLAN (wireless local area network) or Certified Wireless USB (Universal Serial Bus) or via a mobile communications network, in particular via a GSM network (Global System for Mobile Communications) or a UMTS network (Universal Mobile Telecommunications System) or an LTE network (Long Term Evolution) or an LTE-Advanced network.

Furthermore, it can be expedient if the operator control unit transmits the user inputs to the light control unit in a wired manner, preferably via a USB cable.

The above-mentioned variants of the operator control unit and various possibilities for transmitting the user inputs to the light control unit result in the advantage that the vehicle user does not have to make the desired adjustments of the light distributions in the vehicle, nor in the vicinity of the vehicle. Furthermore, no connection needs to be established between the operator control unit and the light control unit as the inputs are being made.

In addition, it can be advantageous if the operator control unit has user input means and if at least one application program that can be run on the operator control unit, in particular a Mobile App (short for "application software"), is stored on the operator control unit, which application program is configured to modify the parameter set for forming the modified parameter set in accordance with the inputs made by means of the user input means.

With regard to the clarity of the user-defined light distribution, it can be advantageous if the operator control unit has user output means and if at least one application program that can be run on the operator control unit, in particular a Mobile App, is stored on the operator control unit, which application program is configured to simulate the user-defined light distribution and to display it schematically to the vehicle user via the output means.

In an expedient embodiment it can be provided that the operator control unit is formed as a vehicle on-board computer.

In a further preferred embodiment, it can be provided that the operator control unit has a first part and a second part, wherein the first part is formed as a portable terminal, preferably a mobile telephone, in particular a smartphone, or a laptop, in particular a notebook, or a tablet, and the second part is formed as a vehicle on-board computer.

In addition, it is expedient if the first part communicates with the second part in a wired manner and/or wirelessly.

The object is also achieved with a method of the type described in the introduction, in which, in accordance with the invention, user inputs are accepted by means of an operator control unit formed separately from the lighting apparatus and from the light control unit and assigned to the light control unit, the parameter set is modified in accordance with the user inputs to produce a further parameter set describing at least one further user-defined light distribution, and the lighting apparatus is adjusted in such a way that the lighting apparatus emits light for forming the user-defined light distribution in accordance with the modified parameter set into an area in front of the lighting apparatus.

With regard to the computing power of the operator control unit, it can be advantageous if the operator control unit transmits the user inputs to the light control unit and the light control unit modifies the parameter set to form the modified parameter set.

With regard to the computing power of the light control unit, it can be advantageous if the operator control unit calls up the parameter set from the light control unit (4), modifies the parameter set to form the further parameter set in accordance with the user inputs, and transmits the modified parameter set to the light control unit.

In addition, it can be expedient if the parameter set and the modified parameter set are stored on the operator control unit.

With regard to the user-friendliness, it can be advantageous if an application program, for example a mobile app, is run on the operator control unit, wherein the application program transmits the user inputs to the light control unit or modifies the parameter set in accordance with the user inputs to form the further parameter set.

With regard to the clarity of the modifications made, it can be advantageous if the application program simulates or simulates and displays the light distribution and/or the user-defined light distribution on the operator control unit.

It is expedient if the operator control unit and the light control unit communicate wirelessly and/or in a wired manner.

In addition, it can be provided advantageously that the operator control unit has a first part and a second part, wherein the first part is formed as a portable terminal, preferably a mobile telephone, in particular a smartphone, or a laptop, in particular a notebook, or a tablet, and the second part is formed as a vehicle on-board computer and the application program simulates the light distribution and/or the user-defined light distribution on the first part and displays it on the first part and/or on the second part.

Figure 2:
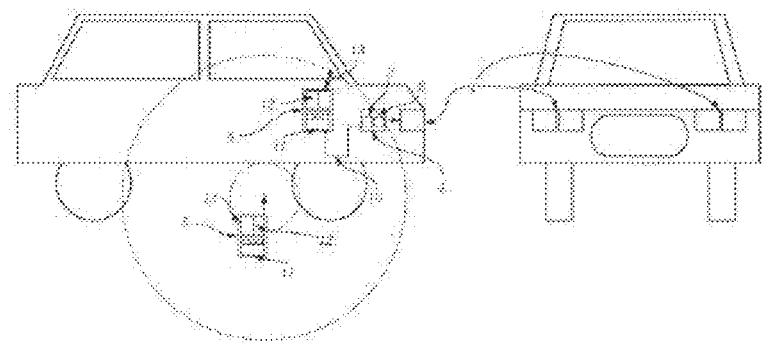
Figure 3:
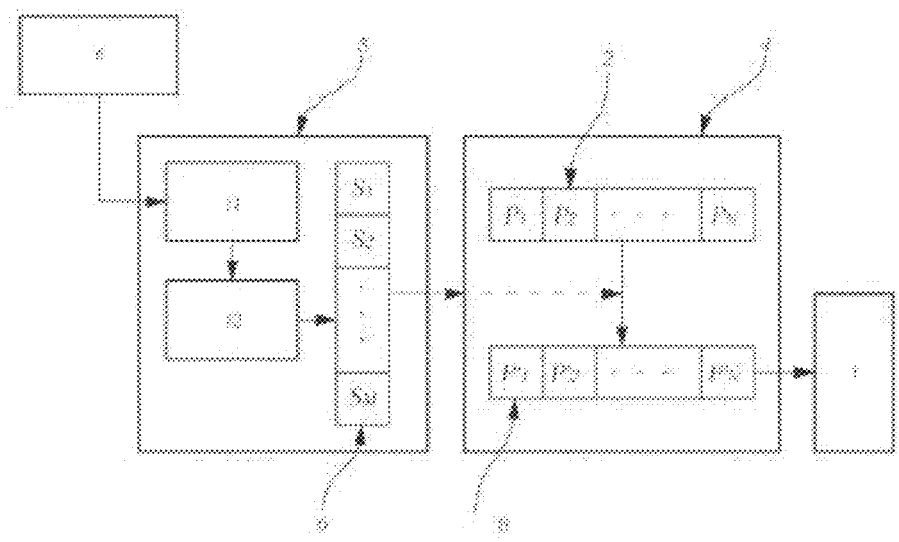
Figure 4:
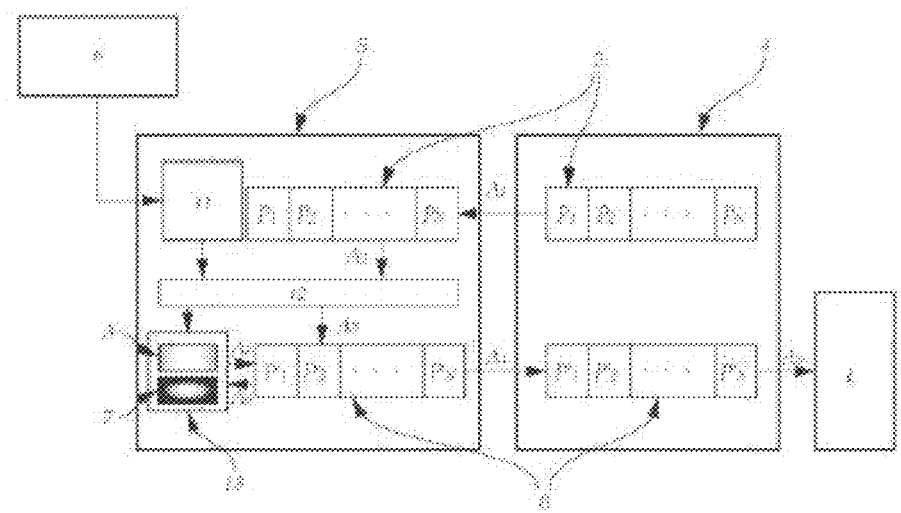

The invention as well as further advantages is explained in greater detail hereinafter with reference to exemplary embodiments illustrated in the drawing, in which FIG. 1 shows an adjusting system with an operator control unit, a light control unit, and headlamp prototypes according to the prior art, FIG. 2 shows the most important components of the adjusting system according to the invention and the relationships therebetween, FIG. 3 shows the interaction of an operator control unit, a light control unit, and a lighting apparatus of FIG. 2, FIG. 4 shows a preferred embodiment of the adjusting system of FIG. 2

Figure 5:
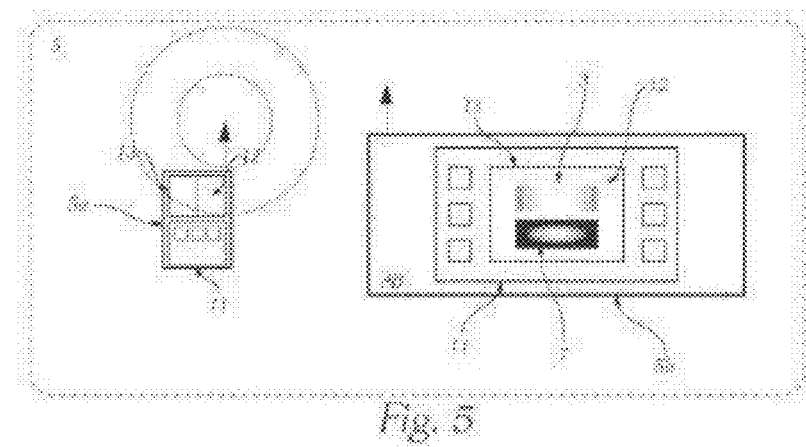
Figure 6:
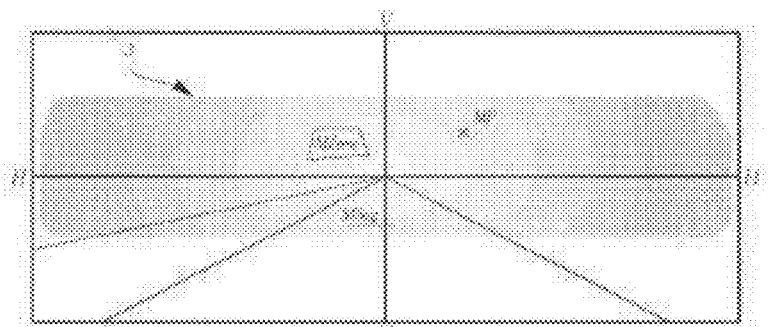
Figure 7:
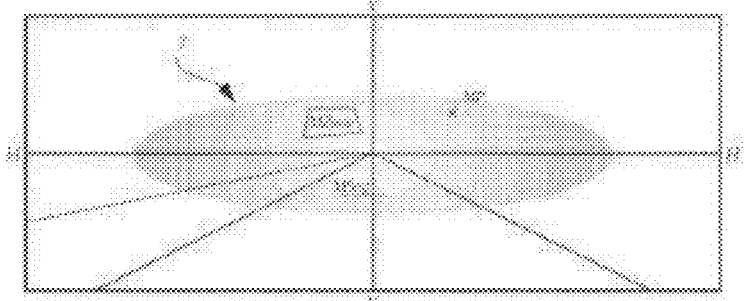
Figure 8:
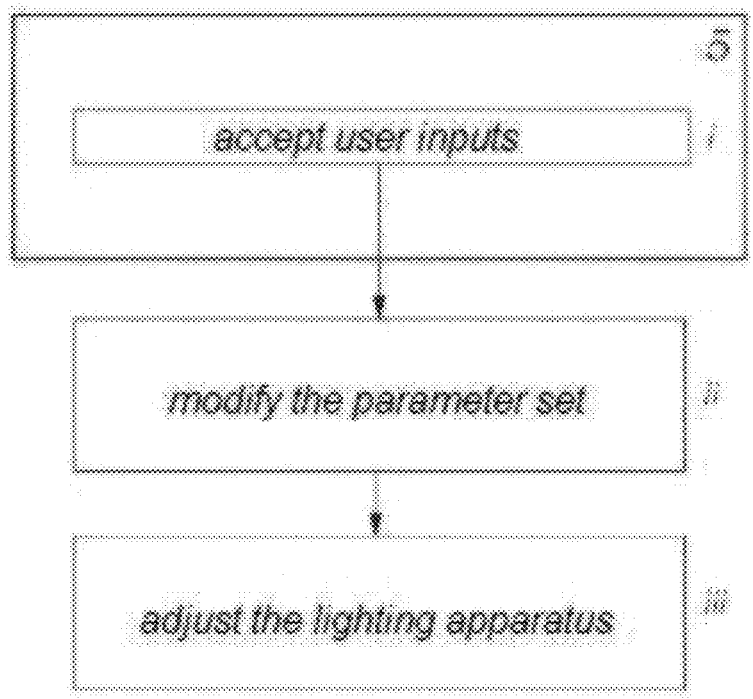
Figure 9:
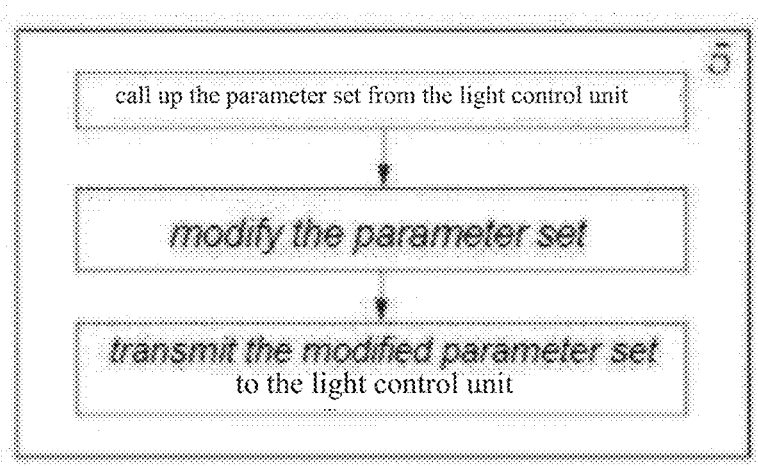
Figure 10:
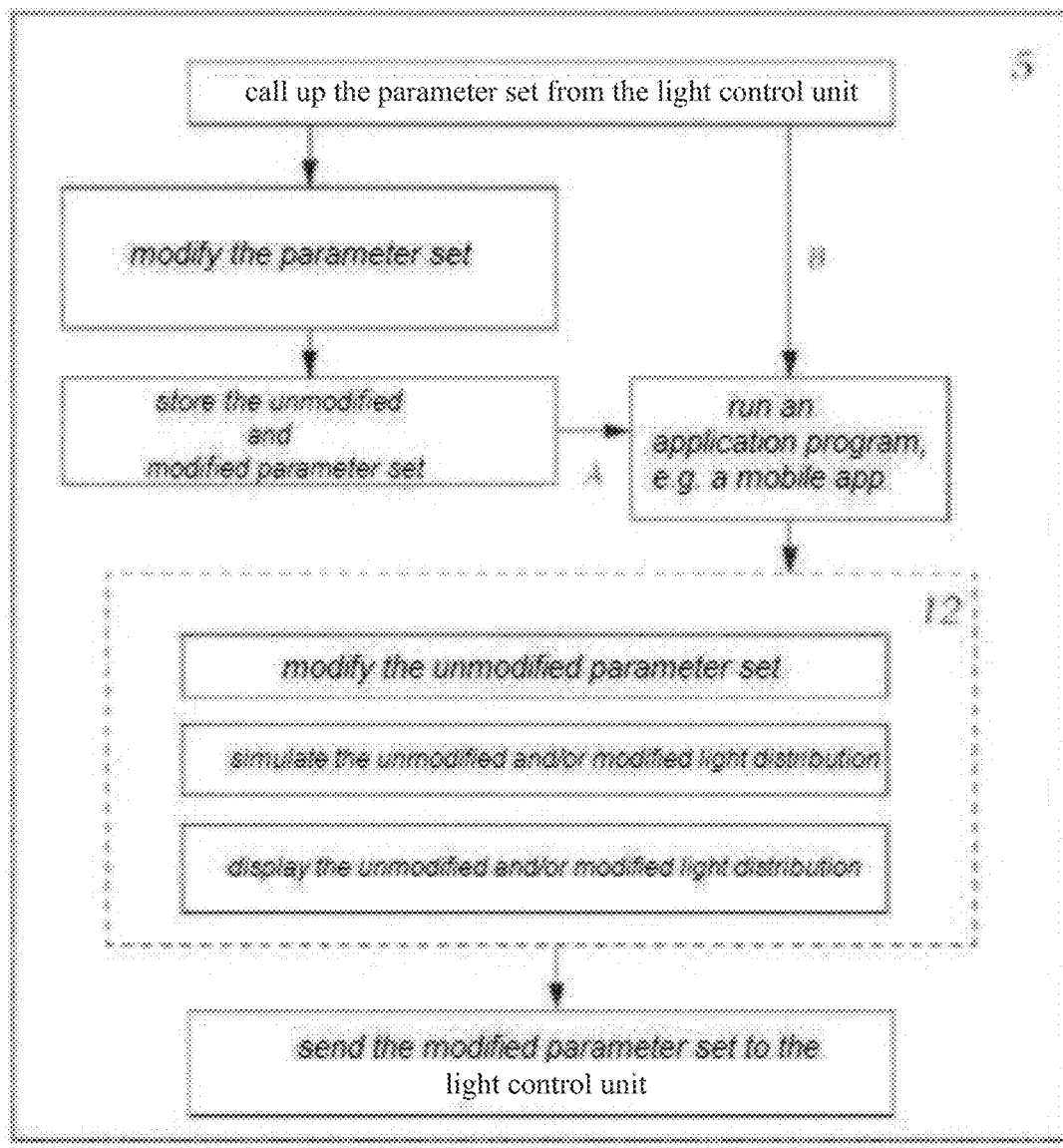

FIG. 5 shows a further preferred embodiment of the adjusting system of FIG. 2 with a two-part operator control unit, FIG. 6 shows a light distribution, FIG. 7 shows a user-defined light distribution, FIG. 8 shows key steps of a method according to the invention for modifying a preferably dynamic light distribution by means of the adjusting system of FIG. 2, FIG. 9 shows a preferred variant of the method of FIG. 8, and FIG. 10 shows a further preferred embodiment of the method of FIG. 8.

Reference is made first to FIG. 1, which, as mentioned in the introduction, shows an adjusting system according to the prior art, in which an operator control unit 5 can configure (adjust) a headlamp prototype 1 with the aid of an application program 12 via a light control unit 4, in such a way that the headlamp prototype 1 emits a light distribution desired by a lighting engineer. The operator control unit 5 for example can be a workplace computer or portable computer, which has input means 11 and output means 13.

Furthermore, simulations of the light distribution for defined headlamp configurations can be performed on an operator control unit 5 of this kind with the aid of other specialised application programs 12. However, as explained above, adjusting systems of this kind cannot be operated without specialist knowledge.

FIG. 2 schematically shows the most important components of the adjusting system according to the invention and the relationships therebetween. Here, the lighting apparatus 1 comprises a total of four front headlamps 1, which emit light onto the carriageway for forming a light distribution 3 (see FIG. 5), although the number of headlamps specified here should not be considered to be prescriptive. For example, the front headlamp can also be a single front headlamp (in the case of single-track vehicles).

The term "carriageway" is used here by way of simplification, because it is of course dependent on the local conditions as to whether the light image is actually disposed on the carriageway or also extends therebeyond. For example, in order to test the emitted light distributions, a projection of the light image onto a vertical surface is generated in accordance with the relevant standards, for example in accordance with regulation numbers 123 and 48 of the United Nations Economic Commission for Europe (UN/ECE) "Adoption of Uniform Adaptive Front-Lighting Systems (AFS) for Motor Vehicles" and "Adoption of Uniform Conditions for Vehicles with regard to the Installation of Lighting and Light-Signalling Devices", Federal Motor Vehicle Safety Standard FMVSS No. 108 for the United States of America "Lamps, reflective devices, and associated equipment, which is specified in the Code of Federal Regulations CFR under the title 49: Transportation in Chapter V, Part 571-Federal Motor Vehicle Standards in subpart B as § 571.108, and the National Standard of the People's Republic of China GB/T 30036/2013 "Adaptive Front-Lighting System for Motor Vehicles", which relate to motor vehicle lighting techniques.

In order to generate a light distribution, the headlamp 1 is controlled by a light control unit 4. In conjunction with the present invention, a "light control unit" is understood to mean the vehicle-side control unit or totality of control units suitable for controlling the optically relevant headlamp components (not shown), for example light sources (lamps, laser diodes or LEDs), reflectors, mirrors, prisms, lenses, light conversion means and other headlamp components suitable for generating, deflecting, converting, focusing/defocusing, collimating and conducting light, or entire light modules assembled from the above-mentioned headlamp components.

The optically relevant headlamp components are controlled differently by the light control unit 4 depending on the type of light distribution to be generated (for example dipped beam light distribution, main beam distribution or poor weather light distribution). Here, data in the form of a parameter set 2 is contained in the light control unit 4, wherein each parameter describes at least one setting of a headlamp component. For example, one parameter can describe the switching on or off of an entire light module (for example main beam module) in the headlamp and assumes only two values: "ON" (the light module is on) and "OFF" (the light module is off). Another parameter can be, for example, intensity modulation of laser light sources or pivoting of micro mirrors (for an explanation of the terms "intensity modulation" of the laser light sources and "micro mirror", see AT 514834 A2 for example). Here, the parameters can be changed statically, quasi-statically (discrete parameters) or dynamically (continuous parameters, for example pivoting speed in the case of a dynamic cornering light distribution or gliding range). Here, the term "quasi-statically" is used particularly frequently in conjunction with oscillating micro mirrors and means that the micro mirrors have a finite number of pivot positions, between which pivot positions the lighting apparatus 1 can be switched during operation by means of the light control unit 4.

In the adjusting system there is provided an operator control unit 5 in accordance with the invention, which operator control unit is assigned to the light control unit 4. The term "operator control unit" is understood in conjunction with the present invention to mean a device that is configured to accept the inputs of the vehicle user, to modify them, and to transmit them wirelessly or in a wired manner to the light control unit 4, such that the light control unit 4 modifies at least some of the parameters in the parameter set and controls the lighting apparatus 1 in accordance with the modified parameter set 8, in such a way that the lighting apparatus emits a modified user-defined light distribution. The light distribution can be a "static" or "dynamic" light distribution. Reference is made here to the prior art (see for example AT 511760 B1) with regard to an explanation of the terms "static" and "dynamic" in conjunction with the light distributions. The operator control unit 5 can be formed differently, for example as a smartphone, a tablet or a laptop. It is important that the operator control unit 5 has a wireless and/or wired communication point, which can be used for communication with the light control unit 4, for example via Bluetooth or via a USB cable 10. In addition, the operator control unit 5 has input means 11, with the aid of which the vehicle user makes his inputs 6 and modifies the pre-set light distribution. Furthermore, it is advantageous if the operator control unit 5 has output means 13 and an application program 12 that can be run is stored on the operator control unit 5, which program simulates the user-defined light distribution, reproduces it schematically, and displays it to the vehicle user with the aid of the output means 13.

FIG. 3 schematically shows an embodiment of the invention, wherein the vehicle user (not shown here) makes his inputs 6 by means of the input means 11 on the operator control unit 5. The inputs 6 are then processed by the application program 12 stored on the operator control unit 5 and are sent to the light control unit 4 in the form of a dataset $S_1$, $S_2$, to $S_M$ that can be recognised by the light control unit 4. Here, the dataset comprises a number of parameters, which number is denoted as M. Once the dataset $S_1$ to $S_M$ has been received, it is used by the light control unit 4 to modify the parameter set 2, which parameter set comprises a number, denoted by N, of parameters $P_1$ to $P_N$, to produce a further parameter set 8, which parameter set likewise comprises a number, denoted as N, of parameters $P'_1$ to $P'_N$. The modified parameter set 8 is sent to the lighting apparatus 1, whereby a lighting apparatus 1 in operation generates a further light distribution 7 (see FIG. 6). The number M of parameters in the dataset $S_1$, $S_2$, ... $S_M$, generally does not exceed the number N of parameters in the parameter set 2. In many cases (for example in the case of a heavily loaded vehicle), it is even more advantageous for the dataset $S_1$, $S_2$, ... $S_M$ to comprise a small number of parameters, and for the original light distribution 3 to be modified only slightly.

In a further expedient variant (FIG. 4) of the present invention, it is provided that the operator control unit 5 can call up the parameter set 2 and has output means 13. Here, the parameter set 2 is modified to form the further parameter set 8 with the aid of the application program 12 in accordance with the user inputs 6 made by the input means 11, which modified parameter set 8 is sent to the light control unit 4 and is then forwarded, unchanged, from the light control unit 4 to the lighting apparatus 1. This corresponds to the arrow sequence $A_1$, $A_2$, $A_3$, $A_4$, $A_5$ in FIG. 4. Both sets of parameters 2 and 8 can be stored on the operator control unit. In addition, it is expedient if the application program 12 and the output means 13 cooperate in such a way that the light distribution 3 described by the parameter set 2 and/or the light distribution 8 described by the modified parameter set 8 are displayed to the vehicle user by the output means 13 and the vehicle user can further modify the user-defined light distribution 7 by further inputs 6 made by means of the input means 11. This corresponds to the arrow sequence $A_1$, $A_2$, $A_3$, $A_6$, $A_7$, $A_5$ in FIG. 4.

FIG. 5 is a further preferred embodiment of the adjusting system, wherein the operator control unit 5 comprises a first part 5a and a second part 5b. The first part 5a of the operator control unit 5 formed here is a portable terminal (smartphone, tablet, laptop) and the second part 5b of the operator control unit 5 formed here as a vehicle on-board computer installed in the dashboard AB of a vehicle (not shown here) can communicate with one another both wirelessly and in a wired manner depending on the preference of the vehicle user. In addition, both the first part 5a and the second part 5b have input means 11, by means of which the vehicle user can input desired modifications of the specified light distribution 3. The modifications of the light distribution 3 resulting in a user-defined light distribution 7 can be viewed immediately by the vehicle user via the output means 13 (for example a screen, which can be touch-sensitive (touchscreen)) on the first part 5a and/or on the second part 5b. The light distributions are displayed on the output means 13 by means of the application program 12 that can be run on the operator control unit 5. It can also be provided that the application program 12 offers a previously already tested selection of coordinated light distributions, which can be selected by the vehicle user and can be used as user-defined light distribution 7. This can be the case when one, two or more sets of parameters describing different legally compliant light distributions are stored in the application program 12. In the case of an emergency there is always a 'lifeline' available if the vehicle user feels overwhelmed by the large number of adjustment possibilities. Furthermore, it is conceivable that the application program 12 is configured to display a dynamic simulation of the light distribution 3 and/or the user-defined light distribution 7 to the vehicle user via the output means 13. Here, it can be provided advantageously that the simulated light distributions are displayed from various perspectives and in various colour displays, for example in a false-colour display or in a Munsell colour system. Here, a driver's view and a birds eye view for example are particularly advantageous in order to illustrate the changes. By means of the simulation and the display, the user-defined light distribution 7 can be adjusted to the vehicle user specifications and can be optimised to the light distribution desired by the vehicle user without having to carry out lengthy test drives. Here, it can also be provided that the application program 12 of the operator control unit 5 warns the driver via acoustic and/or optical signals if the user-defined light distribution 7 does not satisfy the relevant legal requirements.

Generally, the adjusting system of FIG. 2 or of FIG. 5 can be used as follows: The vehicle user switches the vehicle ignition and/or the vehicle engine on, starts the application program 12 on the operator control unit 5, and modifies the light distribution 3 to the user-defined light distribution 7. Alternatively, the modification can also be performed remotely from the vehicle. The actual modification of the light distribution occurs when the vehicle is next started, when the user inputs arrive from the operator control unit at the light control unit.

FIGS. 6 and 7 each show an example of the light distribution 3 (FIG. 6) and the user-defined light distribution 7 (FIG. 6). Here, the light distribution 3 in FIG. 6 is an exemplary light distribution, which does not necessarily satisfy the legal requirements, whereas the user-defined light distribution of FIG. 7 is a main beam distribution satisfying the relevant legal requirements. An alternative situation preferred by the vehicle user is if both the light distribution 3 and the user-defined light distribution 7 satisfy relevant legal requirements and reach predefined values of the illumination intensity (light flux density) at the predefined measurement points MP, measurement segments MSeg and measurement zones MZone in FIGS. 5 and 6. The exact position of these measurement points, measurement segments and measurement zones is specified in the relevant standards (for example ECE R123).

The key steps of a method according to the invention for modifying a preferably dynamic light distribution by means of the adjusting system are shown in FIG. 8. Here, step i) is performed by means of the operator control unit 5 (see FIG. 2).

In the first step i) a vehicle user makes his inputs into the operator control unit 5 by means of the input means 11. In accordance with these inputs 6, the parameter set 2 is modified in a further step ii) to produce a modified parameter set 8, which is now used as the basis for the adjustment of the lighting apparatus 1 by the light control unit 4. In the last, fourth step iii), the lighting apparatus 1 is adjusted in accordance with the modified parameter set 8 in such a way that it emits light onto the carriageway for forming the user-defined light distribution 7.

Here, the transmission can be performed wirelessly, preferably by means of NFC or Bluetooth or infrared or WLAN or Certified Wireless USB or via a mobile communications network, in particular via a GSM network or a UMTS network or an LTE network or an LTE-Advanced network or in a wired manner, preferably via a USB cable.

In a preferred embodiment shown in FIG. 9, the parameter set 2 is modified on the operator control unit 5. Here, the operator control unit 5 first calls up the parameter set 2 from the light control unit 4, then modifies it to form the modified parameter set 8 in accordance with the user inputs 6 made in step i), and transmits the modified parameter set 8 to the light control unit 4.

Alternatively, a method can be envisaged in which, as explained in FIG. 3, the operator control unit 5 transmits the user inputs 6 directly to the light control unit 4, and the light control unit 4 modifies the parameter set 2 to form the modified parameter set 8 and uses this in order to adjust the lighting apparatus 1.

In a further preferred embodiment of the method according to the invention, the steps of which are illustrated in FIG. 10, it is provided that both the unmodified parameter set 2 and the modified parameter set 8 are stored on the operator control unit 5. Here, an application program 12, for example a mobile app, is run, which application program 12 has access to the stored sets of parameters (arrow A) and/or to the called-up parameter set (arrow B). In addition, the application program 12 can modify the unmodified parameter set 2 to form the modified parameter set 8 in accordance with the user inputs 6, can simulate the light distribution 3 and/or the user-defined light distribution 7, and can display the light distribution 3 and/or the user-defined light distribution 7 via output means 13, with which the application program interacts. Here, it is important that the steps that can be performed in the application program 12 can be executed in any sequence. In other words, the vehicle user can be shown the light distribution 3 and the user-defined light distribution 7 for example once the inputs have been made and can compare these two distributions, wherein the vehicle user can then make further inputs for the purpose of a further modification of the light distribution. Alternatively, the vehicle user can be shown only the light distribution 3, and, if no changes are desired, can transmit the unmodified parameter set to the light control unit by means of the operator control unit, without changes.

The embodiments of the invention presented in the description, the claims and the drawings are to be understood to be merely exemplary and non-limiting. Embodiments which emerge from combinations of the described embodiments are also to be considered as included herewith.

The invention claimed is:

1. An adjusting system for a lighting apparatus for vehicles, which lighting apparatus (1) is configured to emit light for forming at least one light distribution (3) described by a parameter set (2) into an area in front of the lighting apparatus (1), wherein the adjusting system is configured to modify the at least one light distribution (3) described by the parameter set (2), and wherein the adjusting system comprises:
   a light control unit (4), in which the parameter set (2) describing the light distribution (3) is stored, the light control unit (4) being assigned to the lighting apparatus (1) and configured to control the lighting apparatus (1) in such a way that the lighting apparatus (1) emits light for forming the at least one light distribution (3) in accordance with the parameter set (2) into an area in front of the lighting apparatus (1); and
   an operator control unit (5) formed separately from the lighting apparatus (1) and from the light control unit (4), the operator control unit (5) being assigned to the light control unit (4) and configured to accept user inputs (6) and to transmit the user inputs (6) to the light control unit (4),
   wherein the light control unit (4) is configured
   to modify the parameter set (2) in accordance with the user inputs (6) to produce a further parameter set (8) describing at least one further user-defined light distribution (7), and
   to adjust the lighting apparatus (1) in such a way that the lighting apparatus (1) emits light for forming the at least one further light distribution (7) in accordance with the further parameter set (8) into an area in front of the lighting apparatus (1),
   wherein the operator control unit (5) is configured
   to call up the parameter set (2) from the light control unit (4),
   to modify the parameter set (2) in accordance with the user inputs (6) to form the further parameter set (8), and
   to transmit the modified parameter set (8) to the light control unit (4), and
   wherein the operator control unit (5) has a first part (5a) and a second part (5b), wherein the first part (5a) is formed as a portable terminal, and the second part (5b) is formed as a vehicle on-board computer.

2. The adjusting system according to claim 1, wherein the light distribution (3) and/or the user-defined light distribution (7) are/is formed as a dynamic light distribution.

3. The adjusting system according to claim 1, wherein the light distribution (3) and/or the user-defined light distribution (7) are/is formed as a light distribution compliant with legal standards.

4. The adjusting system according to claim 1, wherein the operator control unit (5) is configured to store the parameter set (2) and the modified parameter set (8).

5. The adjusting system according to claim 1, wherein the light distribution (3) and the user-defined light distribution (7) belong to the same defined type of light distributions.

6. The adjusting system according to claim 1, wherein the type of light distribution (3) is a dipped beam distribution and/or a main beam distribution and/or a daytime running light distribution and/or a cornering light distribution and/or a fog light distribution and/or a poor weather light distribution.

7. The adjusting system according to claim 1, wherein the operator control unit (5) is formed as a portable terminal, preferably a mobile telephone, in particular a smartphone, or a laptop, in particular a notebook, or a tablet.

8. The adjusting system according to claim 1, wherein the operator control unit (5) is configured to transmit the user inputs (6) to the light control unit (4) wirelessly, by means of NFC or Bluetooth or infrared or WLAN or Certified Wireless USB or via a mobile communications network, in particular via a GSM network or a UMTS network or an LTE network or an LTE-Advanced network.

9. The adjusting system according to claim 1, wherein the operator control unit (5) is configured to transmit the user inputs (6) to the light control unit (4) in a wired manner, preferably via a USB cable (10).

10. The adjusting system according to claim 1, wherein the operator control unit (5) has user input means (11) and at least one application program (12) that can be run on the operator control unit (5), in particular a Mobile App stored on the operator control unit (5), which application program (12) is configured to modify the parameter set (2) for forming the modified parameter set (8) in accordance with the inputs made by means of the user input means (11).

11. The adjusting system according to claim 1, wherein the operator control unit (5) has user output means (13) and at least one application program (12) that can be run on the operator control unit (5), in particular a Mobile App stored on the operator control unit (5), which application program (12) is configured to simulate the user-defined light distribution (7) and to display it schematically to the vehicle user via the output means (13).

12. The adjusting system according to claim 1, wherein the operator control unit (5) is formed as a vehicle on-board computer.

13. The adjusting system according to claiml, wherein the first part (5a) of the operator control unit is formed as a mobile telephone, a smartphone, a laptop, a notebook, or a tablet.

14. The adjusting system according to claim 13, wherein the first part (5a) is configured to communicate with the second part (5b) in a wired manner.

15. The adjusting system according to claim 13, wherein the first part (5a) is configured to communicate with the second part (5b) wirelessly.

16. A method for operating at least one adjusting system for a lighting apparatus for vehicles, which lighting apparatus is configured to emit light for forming at least one light distribution (3) described by a parameter set (2) into an area in front of the lighting apparatus (1), wherein the adjusting system is configured to modify the at least one light distribution (3) described by the parameter set (2), and wherein the adjusting system comprises a light control unit (4), in which the parameter set (2) describing the light distribution (3) is stored, and which is assigned to the lighting apparatus (1) and configured to control the lighting apparatus (1) in such a way that the lighting apparatus (1) emits light for forming the at least one light distribution (3) in accordance with the parameter set (2) into an area in front of the lighting apparatus (1), the method comprising:

i) accepting user inputs (6) by means of an operator control unit (5) formed separately from the lighting apparatus (1) and from the light control unit (4) and assigned to the light control unit (4), ii) modifying the parameter set (2) in accordance with the user inputs (6) to produce a further parameter set (8) describing at least one further user-defined light distribution (7), and iii) adjusting the lighting apparatus (1) in such a way that the lighting apparatus (1) emits light for forming the user-defined light distribution (7) in accordance with the modified parameter set (8) into an area in front of the lighting apparatus (1), wherein:

the operator control unit has a first part (5a) and a second part (5b), wherein the first part (5a) is formed as a portable terminal and the second part (5b) is formed as a vehicle on-board computer, an application program (12) is run on the operator control unit (5), and step ii) is performed as follows:
    calling up the parameter set (2) from the light control unit (4) by means of the operator control unit (5),
    modifying the parameter set (2) in accordance with the user inputs (6) to form the further parameter set (8) by means of the application program (12), and
    transmitting the modified parameter set (8) to the light control unit (4) by means of the operator control unit (5).

17. The method according to claim 16, wherein the light distribution (3) and/or the user-defined light distribution (7) are/is formed as a dynamic light distribution.

18. The method according to claim 16, wherein the light distribution (3) and/or the user-defined light distribution (7) are/is formed as a light distribution compliant with legal standards.

19. The method according to claim 16, wherein the operator control unit (5) transmits the user inputs (6) to the light control unit (4), and the light control unit (4) modifies the parameter set (2) to form the modified parameter set (8).

20. The method according to claim 16, wherein the application program (12) is formed as a mobile app.

21. The method according to claim 16, wherein the application program (12) simulates or simulates and displays the light distribution (3) and/or the user-defined light distribution (7) on the operator control unit (5).

22. The method according to claim 16, wherein the operator control unit (5) and the light control unit (4) communicate wirelessly or in a wired manner.

23. The method according to claim 16, wherein the first part (5a) is formed as a mobile telephone, in particular a smartphone, a laptop, in particular a notebook, or a tablet, and the application program (12) simulates the light distribution (3) and/or the user-defined light distribution (7) on the first part (5a) and displays the light distribution (3) and/or the user-defined light distribution (7) on the first part (5a) and/or on the second part (5b).

* * * * *